United States Patent Office 3,367,135
Patented Feb. 6, 1968

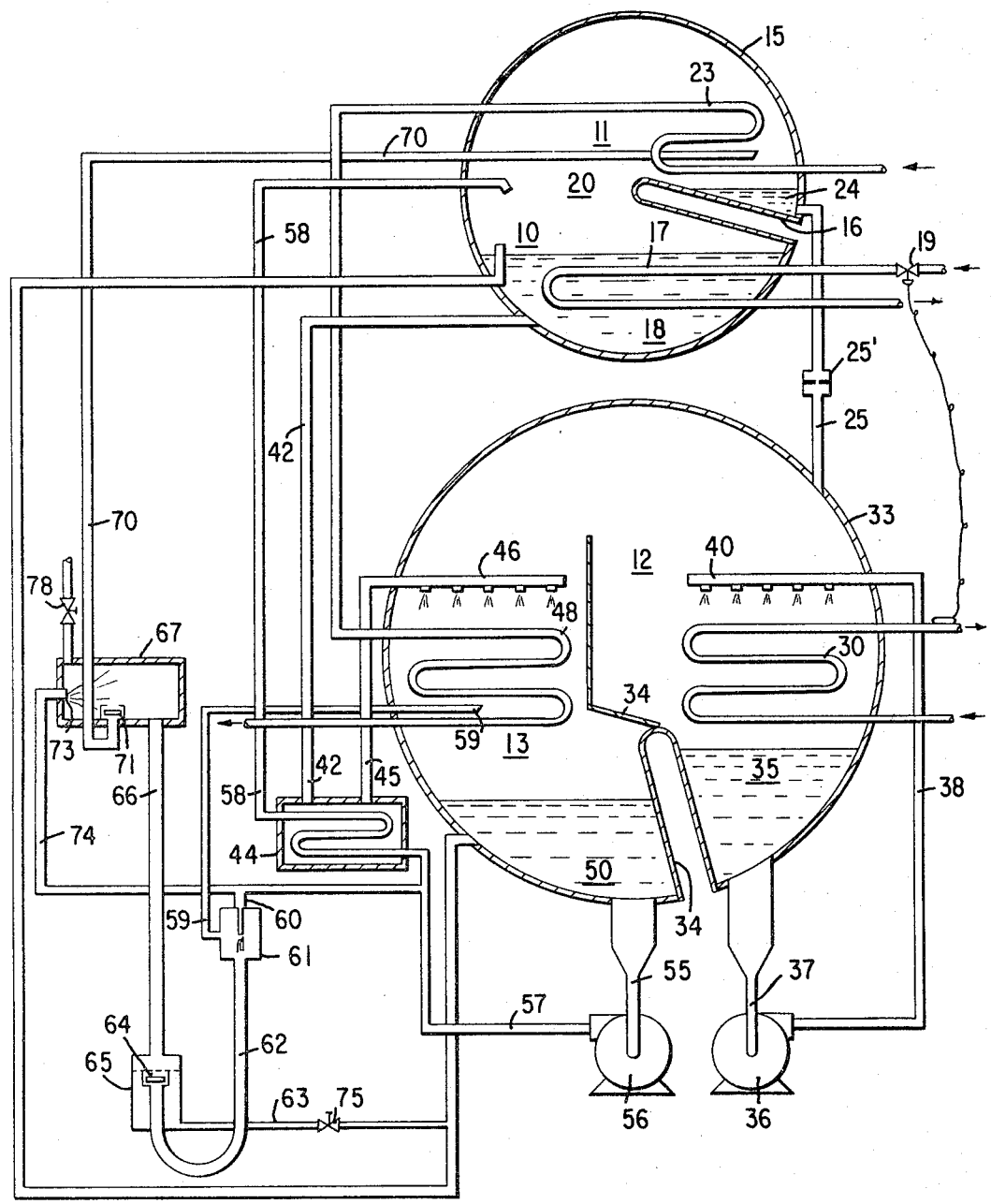

3,367,135
PURGE ARRANGEMENT FOR ABSORPTION
REFRIGERATION SYSTEMS
John A. Greacen, Fayetteville, and Keith V. Eisberg, Camillus, N.Y., assignors to Carrier Corporation, Syracuse, N.Y., a corporation of Delaware
Filed Aug. 30, 1966, Ser. No. 576,051
10 Claims. (Cl. 62—475)

This invention relates to absorption refrigeration systems and, more particularly, to a purge arrangement for removing noncondensable gases from absorption refrigeration systems.

A substantial amount of the noncondensable gases created within an absorption refrigeration system arises in the generator section of that system. The noncondensible gases pass into the system condenser section, are forwarded to the evaporator section, and then pass to the absorber section where they are removed by the system purge arrangement. It is desirable that these noncondensible gases be removed from the system as early as possible and preferably before entry into the system evaporator and absorber sections.

It is a principal object of the present invention to provide an absorption refrigeration system incorporating a mechanism for purging noncondensible gases from the condenser section of the system.

It is an object of the present invention to provide an absorption refrigeration system having a dual purge arrangement adapted to remove noncondensible gases both from the system condenser section and absorber section.

This invention relates to an absorption refrigeration system comprising a generator section, a condenser section, an evaporator section, and an absorber section, the absorber section having a sump within which relatively weak solution is adapted to collect; a purge line opening into the condenser section; a chamber for storing noncondensible gases, the purge line communicating with the storage chamber; pump means for passing solution from the absorber section sump to the generator section; a conduit connected to the discharge side of the pump, the conduit opening into the storage chamber and arranged to discharge solution adjacent the terminal end of the purge line to draw noncondensible gases from the condenser section, the solution serving to absorb refrigerant drawn through the purge line with the noncondensible gases whereby refrigerant is separated from the noncondensible gases for return to the system; and a return line connecting the storage chamber with the absorber section to return solution from the chamber to the system.

Other objects and advantages of this invention will be apparent from the ensuing description and drawing in which the figure is a diagrammatic view of an absorption refrigeration system incorporating the purge arrangement of the present invention.

The absorption refrigeration system of the present invention preferably employs water as the refrigerant and a solution of lithium bromide as the absorbent. It is understood that other refrigerants and absorbents may be used. As used herein, the term "strong solution" refers to a concentrated solution of lithium bromide which is strong in absorbing power; the term "weak solution" refers to a dilute solution of lithium bromide which is weak in absorbing power.

Referring to the attached drawing, there is shown an absorption refrigeration system including a generator section 10, a condenser section 11, an evaporator section 12 and an absorber section 13 interconnected to provide refrigeration.

Generator and condenser sections 10, 11 respectively are encased in a common shell or housing 15 separated by inwardly projecting baffle 16. Generator section 10 has heat exchange tubes 17 passing therethrough. Tubes 17 communicate with a suitable heating medium, i.e. steam. Control valve 19 regulates flow of heating medium through heat exchange tubes 17 of generator section 10 in accordance with the load imposed on the system. Weak solution is heated in generator section 10 to boil off refrigerant vapor thereby concentrating the weak solution in sump 18 of generator section 10. Vaporous refrigerant rises upwardly through the space 20 between shell 15 and baffle 16 into condenser section 11 thereabove.

Condenser section 11 includes a plurality of heat exchange tubes 23 through which any suitable cooling medium such as water is passed. Refrigerant vapor from generator section 10 is condensed to liquid refrigerant by the cooling medium passing through tubes 23, liquid refrigerant accumulating in sump 24 from whence it passes through condensate line 25 and flow control orifice 25' to evaporator section 12.

Evaporator and absorber sections 12, 13 respectively, are encased in comman shell or housing 33 preferably disposed below shell 15. Partition 34 separates evaporator section 12 from absorber section 13. Evaporator section 12 compises heat exchange tubes 30 disposed in a tube bundle located in a region of shell 33. Liquid refrigerant discharged from condensate line 25 accumulates in sump 35 of evaporator section 12. Refrigerant recirculation pump 36 draws refrigerant from evaportaor section sump 35 through line 37, pump 36 discharging refrigerant through line 38 and nozzles 40 over the heat exchange tubes 30 of evaporator section 12.

Water or other heat exchange fluid to be cooled passing through tubes 30 is cooled by the refrigerant discharged over exterior surfaces of the tubes by nozzles 40. Heat absorbed by the refrigerant vaporizes the refrigerant on the exterior surfaces of the tubes. The vaporized refrigerant passes from evaporator section 12 into absorber section 13 carrying with it the heat absorbed from the water in tubes 30. The chilled water may be circulated to a place of use as desired.

Strong solution from sump 18 of generator section 10 flows through strong solution line 42 to heat exchanger 44 where it is placed in heat exchange relation with weak solution returning to generator section 10. Strong solution leaving heat exchanger 44 passes through line 45 to spray nozzles 46 in absorber 13 which distribute the strong solution over heat exchange tubes 48 to wet absorber tubes 48.

Cooling water or other suitable cooling medium is passed through tubes 48 to cool the absorbent solution sprayed on the exterior surfaces of tubes 48. The cooling medium may comprise fluid leaving tubes 23 of condenser section 11, the fluid passing through tubes 48 of absorber section 13 prior to discharge thereof. An absorber section purge line 59 opens adjacent the lower portion of the tube bundle in absorber section 13.

Absorption solution from absorber section sump 50 flows through weak solution line 55 to pump 56. Weak solution from pump 56 passes through line 57, heat exchanger 44 and line 58 into generator section 10 for reconcentration.

To effectuate purging action of line 59, solution taken from the discharge side of pump 56 through line 60 is discharged through chamber 61 into fall tube 62. Purge line 59 opens into chamber 61. The stream of liquid solution emitted from line 60 and falling through chamber 61 draws noncondensible gases from absorber section 13 through purge line 59 into entrainment therewith.

Solution with noncondensible gases entrained therewithin in fall tube 62 flows through check valve 64 into separator 65. Check valve 64 prevents return flow of either solution or noncondensible gases from separator 65 into fall tube 62. Separator 65 divides the lighter, less dense noncondensible gases from the heavier, more dense motive solution. The separated solution is returned to the absorber section sump 50 by means of line 63. Noncondensible gases from separator 65 rise through line 66 into storage and condenser purge chamber 67.

A second purge line 70 opens into condenser section 11 adjacent the upper portion of shell 15. To enhance the efficiency of purge line 70, line 70 is preferably disposed in the part of condenser section 11 expected to have the lowest operating temperature, usually that portion adjacent the fluid inlet to heat exchanger tubes 23. Purge line 70 leads directly to storage chamber 67 and communicates therewith through check valve 71. Check valve 71 prevents return flow of noncondensibles and/or weak solution from storage chamber 67 through purge line 70 to condenser section 11.

To effectuate purging action of line 70, a stream of relatively weak solution is discharged, preferably in the form of a spray as from nozzle 73 into storage chamber 67 proximate purge line 70. A line 74 connects nozzle 73 with the discharge side of solution pump 56. The relatively low vapor pressure of the emitted solution serves to draw a mixture of refrigerant vapor and noncondensible gases through purge line 70. The absorption of refrigerant vapor entrained with the noncondensible gases drawn through purge line 70 by the solution effectively separates the noncondensible gases from the refrigerant vapor. Solution in storage chamber 67 is returned to the system through line 66 and separator 65.

To vent noncondensible gases accumulated in storage chamber 67, control valve 75 is closed to prevent return of solution from separator 65 to the system. With the egress of solution prevented by the closure of valve 75 and by check valves 64, 71, pressures on the noncondensible gases in storage chamber 67 rise as the chamber fills with solution. Valve 78, which is opened, vents noncondensible gases to the atmosphere. Valve 78 may be manually operated, or may comprise a pressure or solution level responsive type valve when automatic venting of the noncondensible gases is desired following closure of control valve 75. Following venting of the noncondensible gases, valve 75 is opened to permit solution filling storage chamber 67 and line 66 to return to the system and enable purging of noncondensibles from both condenser and absorber sections to be resumed.

Orifice 25' in condensate line 25 controls the rate of flow of liquid refrigerant from sump 24 of condenser section 11 to evaporator section 12. Orifice 25' is sized to insure line 25 being filled with solution when system loads are relatively light. With condensate line 25 sealed by solution, escape of noncondensible gases from condenser section 11 through line 25 into evaporator section 12 is prevented.

Other types of flow regulating devices such as a valve may be contemplated in place of condensate line orifice 25'.

By the present construction noncondensible gases from generator section 10 are extracted directly from the system condenser section 11 before passage into the evaporator and absorber sections 12, 13 respectively. At the same time, noncondensible gases in absorber section 13 are purged from the system by line 59.

While we have described a preferred embodiment of our invention, it will be understood that our invention is not limited thereto, but may be otherwise embodied within the scope of the following claims.

We claim:

1. In an absorption refrigeration system of the type having a generator section, a condenser section, an evaporator section, and an absorber section, said absorber section having a sump within which relatively weak solution is adapted to collect, the combination of: a purge line opening into said condenser section; a chamber for storing noncondensible gases, said purge line communicating with said storage chamber; pump means for passing solution from the absorber section sump to said generator section; a conduit leading from the discharge side of said pump, said conduit opening into said storage chamber and arranged to discharge solution adjacent the terminal end of said purge line to draw noncondensible gases from said condenser section, said solution serving to absorb refrigerant drawn through said purge line with said noncondensible gases for return to said system; and a solution return line connecting said storage chamber with said absorber section to return solution to said system.

2. The absorption refrigeration system according to claim 1 in which said purge line opens into said condenser section adjacent a low temperature part of said condenser section.

3. The absorption refrigeration system according to claim 2 in which said condenser section includes tube means adapted to circulate a condensing fluid therethrough, said purge line being adjacent the fluid inlet of said tube means.

4. The absorption refrigeration system according to claim 1 in which said condenser section is arranged above said evaporator section, said condenser section including a sump within which condensed refrigerant is adapted to accumulate; a refrigerant line leading from said condenser section sump to said evaporator section; and flow regulating means for said refrigerant line adapted at relatively low system load to limit flow of refrigerant through said refrigerant line to thereby maintain said refrigerant line sealed whereby escape of noncondensible gases from said condenser section through said refrigerant line into said evaporator section is prevented.

5. The absorption refrigeration system according to claim 4 in which said refrigerant line flow regulating means comprises an orifice.

6. The absorption refrigeration system according to claim 1 in which said purge line includes one-way valve means to prevent return of noncondensible gases in said chamber through said purge line to said condenser section.

7. The absorption refrigeration system according to claim 1 including: a second purge line opening into said absorber section; a separator for separating noncondensible gases from solution; said second purge line communicating with said separator; a fall tube communicating with said separator; a second conduit connecting the discharge side of said pump with said separator, said second conduit being adapted to discharge a stream of solution into said fall tube to draw noncondensible gases through said second purge line from said absorber section, said solution stream carrying said noncondensible gases through said fall tube to said separator; and a conduit for conveying noncondensible gases from said separator to said storage chamber, said solution return line being arranged to return solution from said separator to said absorber section.

8. The absorption refrigeration system according to claim 7 in which said second purge line includes one-way valve means to prevent return of noncondensible gases to said absorber section.

9. The absorption refrigeration system according to claim 7 including a valve for closing said return line to fill said storage chamber with solution, and exhaust valve means for venting said storage chamber to the atmosphere whereby noncondensible gases accumulated in said storage chamber are exhausted to the atmosphere.

10. The absorption refrigeration system according to claim 1 in which said conduit includes a nozzle for discharging solution into said storage chamber as a spray.

References Cited

UNITED STATES PATENTS

| | | | |
|---|---|---|---|
| 2,703,968 | 3/1955 | Berestneff | 62—475 |
| 2,760,350 | 8/1956 | Bourne | 62—475 |
| 3,131,546 | 5/1964 | Osborne | 62—195 |

LLOYD L. KING, *Primary Examiner.*